(12) United States Patent
Whitehouse

(10) Patent No.: US 11,861,945 B2
(45) Date of Patent: *Jan. 2, 2024

(54) SYSTEM AND METHOD FOR FACILITATING TRANSACTION DATA RETRIEVAL

(71) Applicant: PSI Systems, Inc., Palo Alto, CA (US)

(72) Inventor: Harry T. Whitehouse, Portola Valley, CA (US)

(73) Assignees: PSI SYSTEMS, INC., Palo Alto, CA (US); STAMPS.COM INC., El Segundo, CA (US)

( * ) Notice: Subject to any disclaimer, the term of this patent is extended or adjusted under 35 U.S.C. 154(b) by 352 days.

This patent is subject to a terminal disclaimer.

(21) Appl. No.: 16/929,031

(22) Filed: Jul. 14, 2020

(65) Prior Publication Data
US 2020/0410776 A1 Dec. 31, 2020

Related U.S. Application Data

(62) Division of application No. 12/842,695, filed on Jul. 23, 2010, now abandoned.
(Continued)

(51) Int. Cl.
G07B 17/00 (2006.01)
G06Q 20/10 (2012.01)

(52) U.S. Cl.
CPC ....... G07B 17/00435 (2013.01); G06Q 20/10 (2013.01); G07B 2017/00427 (2013.01)

(58) Field of Classification Search
CPC ......... G07F 17/32; G07F 17/16; G06Q 40/04; G06Q 20/02; G06Q 20/10; G06Q 10/0833; G07B 17/00435
See application file for complete search history.

(56) References Cited

U.S. PATENT DOCUMENTS

| 5,319,562 A | 6/1994 | Whitehouse |
| 6,005,945 A | 12/1999 | Whitehouse |

(Continued)

FOREIGN PATENT DOCUMENTS

| DE | 10060209 A1 | 4/2001 |
| EP | 2053563 A1 | 4/2009 |

(Continued)

OTHER PUBLICATIONS

Non-Final Office Action issued in corresponding U.S. Appl. No. 13/842,883 dated Oct. 5, 2015.
(Continued)

*Primary Examiner* — Hao Fu
(74) *Attorney, Agent, or Firm* — Concept IP LLP; Pejman Yedidsion

(57) ABSTRACT

In certain embodiments, transaction data retrieval from a postage vendor system database may be facilitated (e.g., via label generation with multiple barcode representations of a portion of a postage tracking identifier, where the tracking identifier is generated based on a carrier-specific tracking identifier unique within a carrier system with respect to accounts recognized by the carrier system). In some embodiments, the tracking identifier may be generated such that (i) the tracking identifier comprises the carrier-specific tracking identifier and (ii) enables a mail piece associated with a postage transaction to be tracked within the carrier system, and the tracking identifier portion is allocated to the postage transaction in one or more databases of the vendor system. An indicium identifier may be generated to comprise the tracking identifier portion, thereby enabling the vendor system to identify the postage transaction using one of the two identifiers without the other one of the identifiers.

19 Claims, 11 Drawing Sheets

Related U.S. Application Data

(60) Provisional application No. 61/229,181, filed on Jul. 28, 2009.

(56) References Cited

U.S. PATENT DOCUMENTS

| | | | |
|---|---|---|---|
| 6,816,844 B2 | 11/2004 | Leon | |
| 7,069,253 B2 | 6/2006 | Leon | |
| 7,203,666 B1* | 4/2007 | Gravell | G07B 17/00435 705/401 |
| 7,346,590 B2 | 3/2008 | Critelli et al. | |
| 7,458,612 B1 | 12/2008 | Bennett | |
| 7,523,074 B2 | 4/2009 | Mattern | |
| 7,685,028 B2 | 3/2010 | Gross | |
| 7,963,437 B1 | 6/2011 | McBride et al. | |
| 8,510,233 B1* | 8/2013 | Leon | G07B 17/00024 705/410 |
| 8,612,361 B1* | 12/2013 | Bussell | G07B 17/00435 705/401 |
| 9,208,620 B1 | 12/2015 | Bortnak et al. | |
| 2003/0225711 A1 | 12/2003 | Paping | |
| 2004/0083233 A1 | 4/2004 | Willoughby | |
| 2004/0088266 A1 | 5/2004 | Briley et al. | |
| 2004/0122779 A1 | 6/2004 | Stickler et al. | |
| 2004/0193436 A1 | 9/2004 | Stashluk, Jr. et al. | |
| 2004/0215531 A1 | 10/2004 | Stashluk, Jr. et al. | |
| 2005/0055319 A1 | 3/2005 | Monsen et al. | |
| 2005/0065897 A1* | 3/2005 | Ryan, Jr. | G07B 17/00024 705/401 |
| 2005/0184140 A1* | 8/2005 | DeLa Vergne | B65D 27/06 229/80 |
| 2005/0187886 A9 | 8/2005 | Stickler et al. | |
| 2005/0192912 A1 | 9/2005 | Bator et al. | |
| 2005/0234836 A1 | 10/2005 | Foth et al. | |
| 2005/0278263 A1 | 12/2005 | Hollander et al. | |
| 2006/0112024 A1 | 5/2006 | Wadd et al. | |
| 2006/0122947 A1 | 6/2006 | Poulin | |
| 2006/0190418 A1 | 8/2006 | Huberty et al. | |
| 2006/0230000 A1 | 10/2006 | Lubinger | |
| 2007/0129957 A1 | 6/2007 | Elliot et al. | |
| 2007/0130091 A1 | 6/2007 | Cordery et al. | |
| 2007/0179913 A1 | 8/2007 | Ferraro | |
| 2009/0024544 A1 | 1/2009 | Elliot et al. | |
| 2009/0106146 A1 | 4/2009 | Ferraro et al. | |
| 2009/0171848 A1 | 7/2009 | Wronski, Jr. et al. | |
| 2009/0171861 A1 | 7/2009 | Horree et al. | |
| 2009/0182687 A1 | 7/2009 | Stickler et al. | |
| 2010/0235303 A1* | 9/2010 | Lynch | G06Q 30/02 709/204 |
| 2012/0054122 A1 | 3/2012 | Mallozzi et al. | |
| 2013/0304663 A1 | 11/2013 | Whitehouse | |

FOREIGN PATENT DOCUMENTS

| | | |
|---|---|---|
| WO | 2003032110 A2 | 4/2003 |
| WO | 2009055385 A1 | 4/2009 |

OTHER PUBLICATIONS

International Preliminary Report on Patentability issued in corresponding PCT/US2020/043036 dated Sep. 16, 2011.

International Search Report and Written Opinion issued in corresponding PCT/US2020/043036 dated Oct. 5, 2010.

The United States Postal Service (USPS), Performance Criteria for Information-Based Indicia and Security Architecture for Open IBI Postage Evidencing Systems, Information Based Indicia Program, Jun. 25, 1999.

* cited by examiner

SYSTEM AND METHOD FOR FACILITATING TRANSACTION DATA RETRIEVAL

CROSS REFERENCE TO RELATED APPLICATIONS

This application is a divisional application of U.S. patent application Ser. No. 12/842,695, filed Jul. 23, 2010, which is based on and claims priority to U.S. Provisional Patent Application No. 61/229,181, filed Jul. 28, 2009, the entire contents of each application is hereby incorporated herein by reference.

BACKGROUND OF THE INVENTION

Field of the Invention

The present invention pertains to transaction data retrieval and processing, including, for example, retrieval and processing of postage transaction data.

Discussion of Related Art

Centralized, internet-based postage systems have achieved wide acceptance since their conception in the mid-1990's. U.S. Pat. No. 6,005,945 to Whitehouse describes in detail internet-based postage systems and methods. In this model, rather than having independent, stand-alone electro-mechanical postage meters located throughout the country, an array of equivalent "virtual meters" is maintained in a database at a centralized server site. Each postage transaction uses a secure communication from the end user to the centralized server site. This type of system generates a centralized database of indicium and, in the case of shipping labels, associated tracking database that encompasses a whole mailing and shipping behavior of a plurality of users (e.g., hundreds of thousands of users). Another aspect of PC-based postage is the serialization of each postage indicium. Each indicium has a unique combination of account number and serial number (also referred to as "piece count" in the mailing industry). This idea is disclosed in U.S. Pat. No. 5,319,562 and reiterated in U.S. Pat. No. 6,005,945.

Returned goods represent a substantial percentage of packages shipped worldwide. The term "Reverse Logistics" has been coined to describe this sector of the shipping industry. FIG. 1 shows a conventional U.S. Postal Service Merchandise Return Label (MRL). This type of label can be distributed in bulk. For example, the return labels can be provided in the box of each order shipped by a shipper (e.g., Amazon.com). The cost of each label is only a few fractions of a cent. Hence, the shipper (e.g., Amazon.com) does not incur an important expense. Only a few percent of the packages sent out will require the MRL and the U.S. Postal Service only charges for the labels actually placed in the mail stream, i.e., the labels used. Often the "From" address is not filled out, as it is optional. However, the delivery address references the "Postage Due Unit" at the receiving Post Office.

As shown in FIG. 1, the return label includes a series of horizontal black bars (in this case 7 bars) under the permit box "NO POSTAGE NECESSARY IF MAILED IN THE UNITED STATES". These bars are a visual queue to USPS operations that some accounting must be done on this piece. These same horizontal bars are also used on a reply postcard in a magazine. This is the only visual queue provided to the USPS so the label can be accounted for. These bars are detected by the human eye, not a machine. If these bars are not seen or detected and accounted for, the USPS will lose the revenue associated with the mail piece on which the label is applied.

Merchandise Return Labels are historically paid for via a USPS permit. For example, as shown in FIG. 1, the Merchandise Return Label is paid for using permit 307 issued by the Los Angeles Main Post Office. When returned packages are received at the Postage Due unit, they are manually weighed and the appropriate rate is computed. The rate must take into account the origin and the destination in most cases because rates are normally "zone based." Each piece is then manually logged into a computer system so that the permit holder (e.g., Amazon.com) can have funds deducted from their permit account.

To acquire a permit, the account holder must pay an annual fee for the permit, as well as an annual accounting fee. In addition, the account holder is charged a surcharge over normal rates for each package. Therefore, this is an expensive option for both the account holder and the Postal Service.

Another heavily used but highly manual system employed by the U.S. Post Office is the Express Mail Corporate Account (EMCA). Many mailers still use the original multi-part Express Mail form shown in FIG. 2. In addition, since typewriters have disappeared from most homes and offices, these Express Mail forms are almost always filled out by hand. The label is accompanied by some form of postage payment, a meter strip from a retail post office counter, a conventional postage meter strip applied by the customer, conventional stamps or simply an Express Mail Corporate Account (EMCA) number.

Express Mail goes through a formal acceptance process at the induction post office (PO). The PO employee will weigh the package and input the weight of the package, along with the delivery address and tracking barcode number into a retail Post Office terminal. Even if the Express Mail piece is dropped in a street mail box (blue box), the origin PO has a responsibility to enter this information. In the case of payment by EMCA, the PO employee will enter that along with the other information. However, there is no way to tell at the time of induction if the EMCA account is valid or it belongs to the mailer. Furthermore, the process is highly manual, with carbon copies being removed and saved by the induction PO as well as those responsible for final billing.

Some mailers have begun switching to a single ply version of the Express Mail label which can be computer generated. An example of a conventional computer generated mail express label is shown in FIG. 3. The postage payment methods are typically a PC postage Information Based Indicium (IBI), a conventional meter strip, a retail PO counter strip or conventional stamps. However, this particular label format currently cannot be used for EMCA mailings. The EMCA approach is functionally identical to the permit based system of FIG. 1. Essentially, the mailer opens and maintains an account with the post office (either permit or EMCA) and funds are deducted from this account when relevant "reply" mail pieces are manually detected in the mail stream.

A prepaid return label printing solution for Priority and Express mail labels has been introduced by Endicia Internet Postage (circa 2004). The software logic essentially reverses the return address and delivery address of what would be normal Priority Mail label. It adds the legend "No Postage Stamp Necessary" and removes the postmark date (since the induction date will generally be unknown). The postage is properly computed by taking into account the postal zones.

This computer image may be emailed to a customer or displayed on a Web site, and provides a quick and easy way for a vendor to supply a prepaid return label. Because this is completely prepaid, there is no permit fee, no accounting fee, no delay at the receiving post office, and no manual accounting required.

The limitation of this type of return label is that the postage has been prepaid by the PC postage account holder. If this label is not used, the postage is essentially wasted. Therefore, this label concept is well suited for customer interactions where the merchant is quite certain the customer will be returning the goods. These types of customers are generally easy to identify by either call center or Web site interactions. However, the limitation remains as the postage is consumed when the postage label is printed.

Those unfamiliar with the operational of National Posts may question why the revenue collection for return shipping labels is such a difficult problem. National Posts or Postal Services like USPS have operated with a prepaid model for hundreds of years. However, in the prepaid return shipping labels, each mail piece has to provide an indication that the postage has already been paid via some method such as stamps, meter mark, PC postage indicium, permit account, EMCA, etc. There is no "after the fact" billing. National Post delivery networks are generally point to point, as opposed to FedEx® or UPS™. That is, if a package originates in San Francisco (SF), Calif. and is going to Los Angeles (LA), Calif., the package will likely be trucked or flown directly from SF to LA.

In contrast, FedEx® and UPS™ operate hub systems where all packages flow through a single hub facility. With a hub system, one can be assured that each and every package will be processed by automated scanning systems at the hub, and the processing scans will result in the final billing to the shipper. Hence, the same SF to LA package, if for instance handled by FedEx®, would be flown to Memphis, TN on the first evening and then flown from Memphis to LA the next morning.

The present invention addresses various issues relating to the above and other issues with conventional approaches.

BRIEF SUMMARY OF THE INVENTION

In some embodiments, transaction data retrieval from a postage vendor system database may be facilitated. In some embodiments, transaction data retrieval may be facilitated via label generation with multiple barcode representations of a portion of a postage tracking identifier, where the postage tracking identifier is generated based on a carrier-specific tracking identifier unique within a carrier system with respect to accounts recognized by the carrier system. In some embodiments, the postage tracking identifier may be generated such that (i) the postage tracking identifier comprises the carrier-specific tracking identifier and (ii) enables a mail piece associated with a postage transaction to be tracked within the carrier system, and the tracking identifier portion is allocated to the postage transaction in one or more databases of the vendor system. An indicium identifier may be generated to comprise the postage tracking identifier portion, thereby enabling the vendor system to identify the postage transaction using one of the two identifiers without the other one of the identifiers.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the invention, the structural components illustrated herein are drawn to scale. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF EMBODIMENTS OF THE INVENTION

An embodiment of the present disclosure focuses on the extension of the internet postage model and revises the mechanism, and particularly the timing, of customer payments for use of the postal delivery service. One immediate use of an embodiment of the present invention is in the area of "reply postage." However, it should be appreciated that, the present method and system is also applicable to all types of postage transactions. According to one embodiment, the method or system of the present invention can create a mail piece (e.g., a shipping label) with a serialized indicium associated with a given customer account, but with an assigned indicium having a value of $0.00. When the mail piece is inducted into the mail stream, an operational scan or operational scans of postage barcode and/or tracking barcode are reported back to the centralized postage system. The operational scan(s) can optionally identify the induction point and the delivery point. The class of mail is typically known and established at the time of printing the mail piece. The weight is either recorded at induction, measured during an in process weigh/scan operation, or irrelevant in the case of using weight-independent mail class (e.g., an Express Mail Flat Rate Box). When the scan information is received by the centralized postage system operation, the correct postage can then be computed and charged to or deducted from the end-user's postage account.

This method and system can replace the manual process used by the postal service for reply mail. For the U.S. Postal Service, the method and system described herein can be used to replace the Express Mail Corporate Account (EMCA) and the Merchandize Return Label Service (MRLS) programs. The method and system described herein allow, for example, the creation and distribution of numerous serialized shipping labels without actually incurring the upfront cost of the postage indicium. As a result, this can provide cost savings for the shipper (e.g., Amazon.com) as the mailing label does not have a monetary value attached or assigned to it until it is used in the course of shipping a package or sending mail from point A to point B. The method and system can also allow for pre-addressed labels, or labels where the destination address is filled out by hand while a person is on travel. The process does not deduct or charge actual funds from the customer's account until the mail piece is actually being processed by the postal service (e.g., Post Office).

Figure 1:
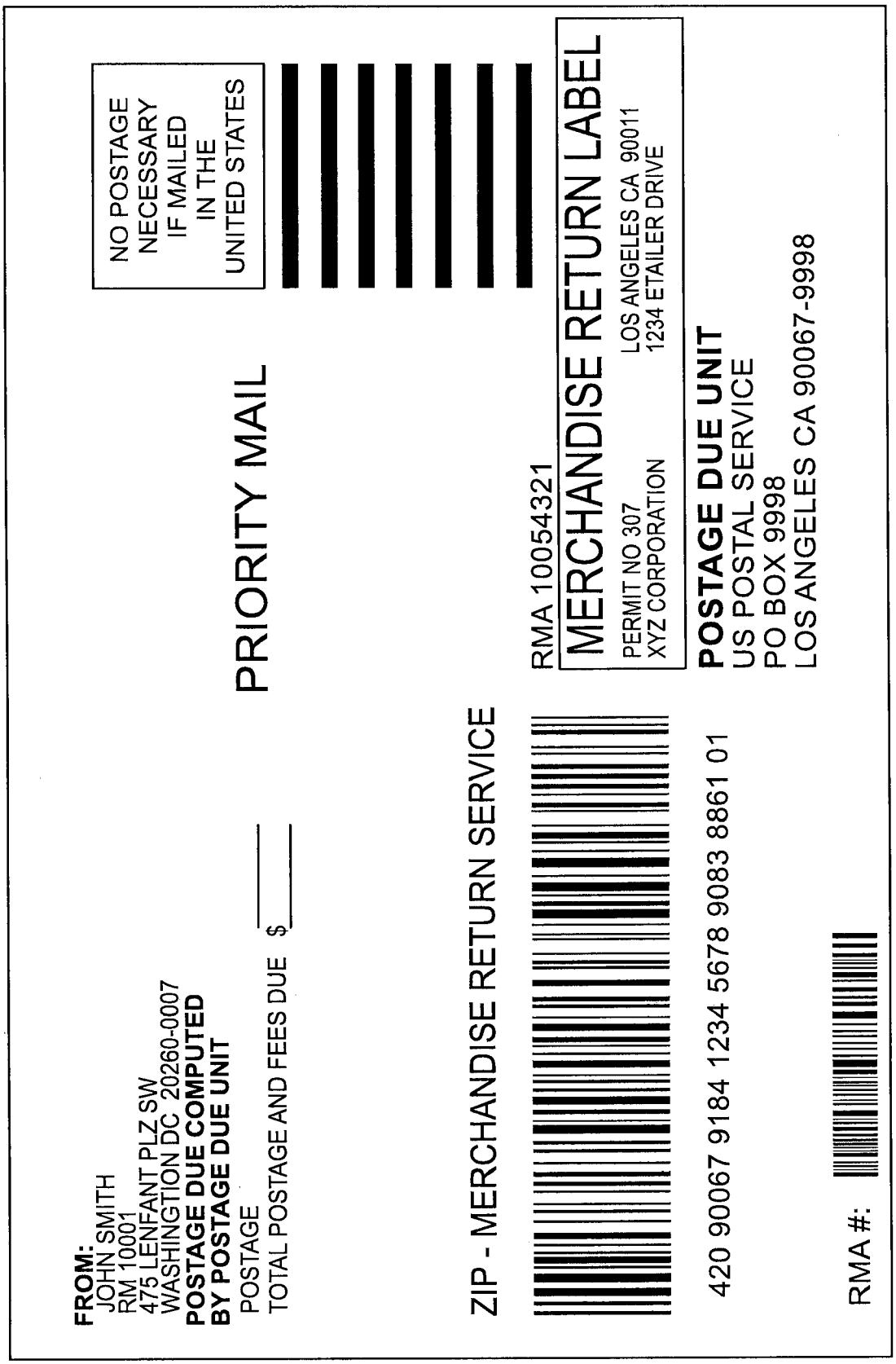
FIG. 1 is a view of a conventional merchandise return label postage label.
Figure 2:
FIG. 2 is a view of a conventional express mail label used by the U.S. postal service.
Figure 3:
FIG. 3 is a view of a conventional computer generated express mail label.
Figure 4:
FIG. 4 is a view of a printed prepaid return label, according to an embodiment of the present invention.
Figure 5:
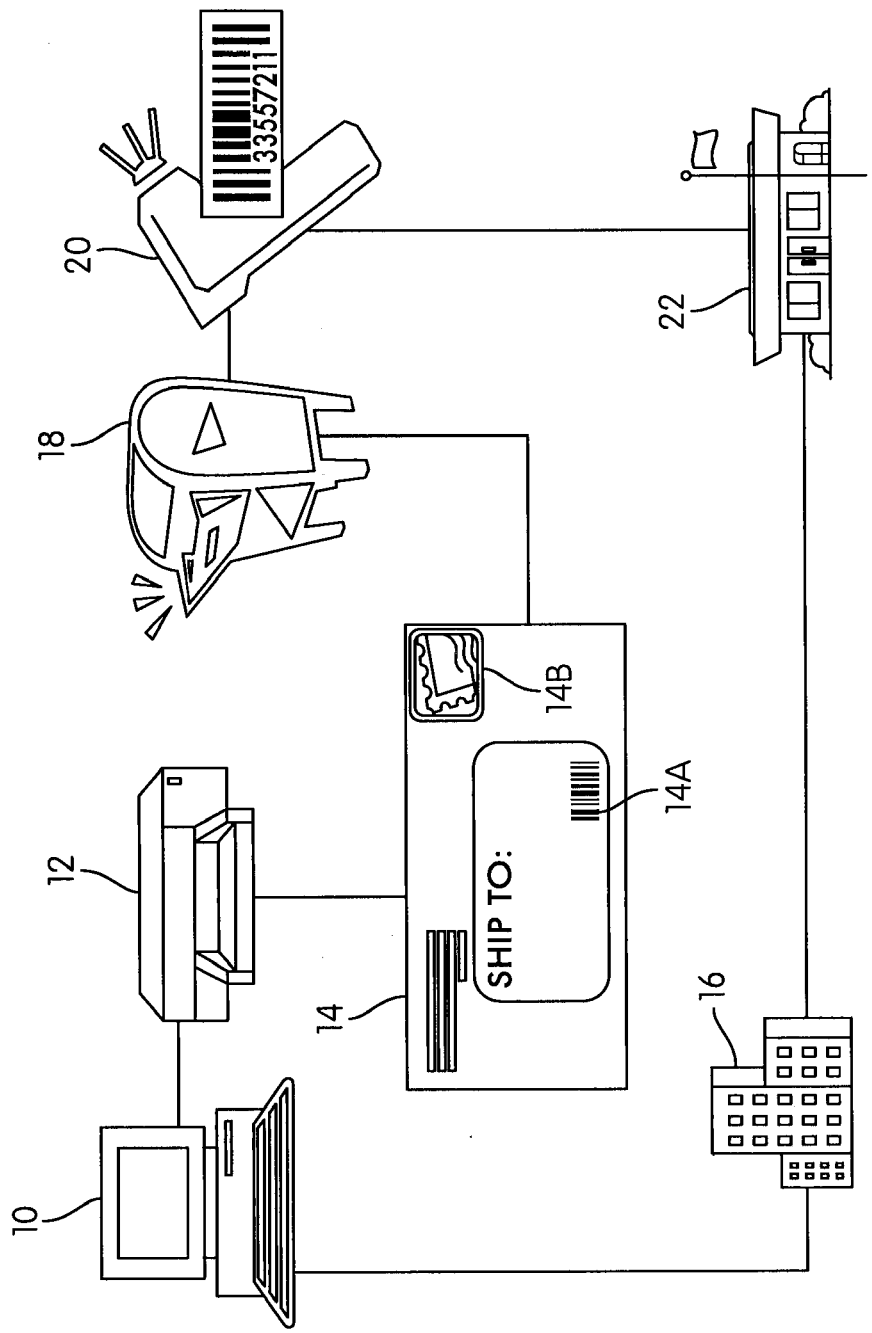
FIG. 5 depicts a schematic diagram for creating a mail label and processing mail having the mail label in the mail stream, according to an embodiment of the present invention.
Figure 6:
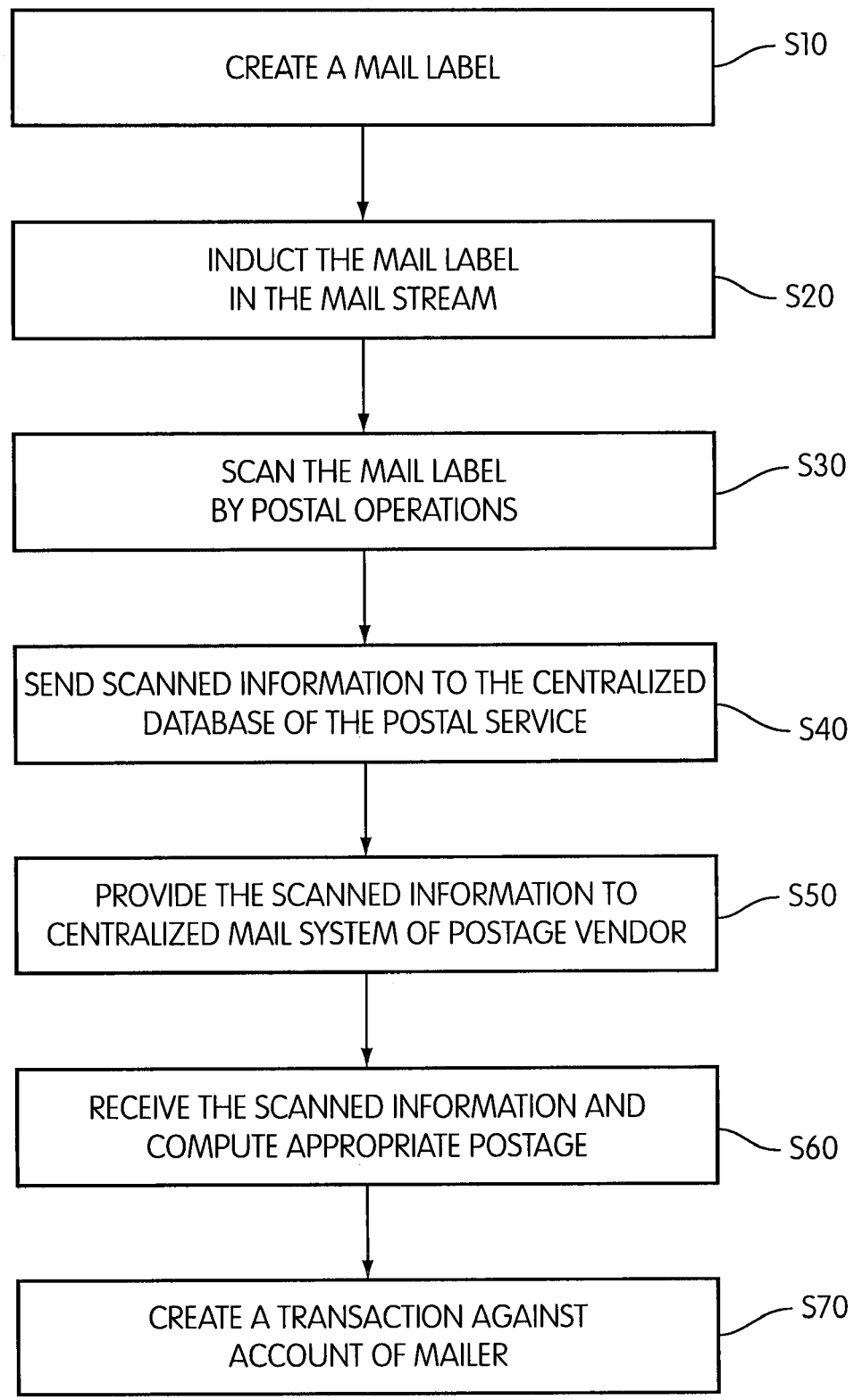
FIG. 6 is a flow chart depicting the various steps for processing mail in the mail stream, according to an embodiment of the invention.

In accordance with one embodiment, a centralized postage system is employed to create reply labels similar to the reply labels shown in FIG. 4. FIG. 5 depicts a schematic diagram for creating a mail label and processing mail having the mail label in the mail stream, according to an embodiment of the present invention. FIG. 6 is a flow chart depicting the various steps for processing mail in the mail stream, according to an embodiment of the invention. Referring to both FIG. 5 and FIG. 6, a user interface implemented by software executed by a computer 10 allows the account holder to create a label 14 by using a printer 12 connected to the computer 10, at S10. The label 14 contains a tracking barcode 14A and a postage value indicium 14B, such as a two dimensional postage IBI (information based indicia) barcode, representing a given mail class (first class mail, priority mail, express mail, etc.). The generated postage value indicium (e.g., an IBI indicium) has a zero valuation (i.e., $0), but is assigned a unique piece count or serialized indicium and treated like any other indicium. No funds are charged or deducted from the postage balance at the account of the user residing at the postage provider facility 16 or centralized postage system 16 of the postage vendor for creating the reply label 14 or printing the reply label 14.

If and when the reply label is inducted in the mail stream (depicted in FIG. 5 as a street postal service mail box) at S20, the label is scanned by the postal service operations using a scanner 20, at S30. The label may be scanned at numerous points along its delivery cycle. In one embodiment, the label can be for example scanned one, two or more times, for example at delivery, and at various times as the mail associated with the label traverses the postal service operational system. The scanned information including the tracking barcode (e.g., a 1D barcode) 14A and optionally the postage value indicium (e.g., a IBI barcode such as 2D barcode) 14B and the weight of the mail piece are sent to the centralized database of central mail facility or postal service 22 (e.g., USPS Package Tracking System (PTS), at S40. The central mail facility 22 provides the tracking barcode (e.g., 1D barcode) 14A scans and optionally the postage value indicium (e.g., IBI barcode such as a 2D barcode) 14B scans to the centralized mail system 16 of postage vendor, for example, in a FTP file, as S50. As stated above, the postage value indicium (e.g., 2D barcode) 14B may include a serialized indicium or piece count. The postage value indicium indium 14B may further include a portion of the tracking barcode 14A. For example, in one embodiment, postage value indicium 14B may include the last 9-digits of the tracking barcode 14A. In this case, scanning the tracking barcode 14A and/or the postage value barcode can identify a transaction that created the label. The tracking barcode 14A can be a "delivery confirmation" barcode in USPS First Class or Priority Mail or "an express mail tracking code" in USPS Express Mail, or a "customs barcode" in an international customs form. In one embodiment, the scanned information including the tracking barcode (e.g., 1D barcode) 14A is provided to the centralized mail system 16 of the postage vendor in nearly real time. In another embodiment, the files can be provided on an hourly basis using, for example, FTP protocols from the USPS Package Tracking System (PTS) to the centralized postage system 16 of the postage vendor. Typically, a given postage label will see multiple in-transit scan reports and will always show at minimum a delivery scan. For Express Mail, the scan rate is extensive and includes the acceptance scan at induction, numerous in process scans, and a delivery scan with potentially a signature capture. In other words, it can be assumed with near certainty that any label inducted in the mail stream will be detected and reported back to the postage vendor.

When mail stream information is received at the centralized postage system of the postage vendor (e.g., in a form of a FTP file), the postage vendor computes the appropriate postage cost for this transaction, at S60 and creates another transaction against the mailer's account, at S70. This results in no printed output, but simply adds another indicium record to the account's postage history.

The return labels can be pre-addressed (as shown for example in FIG. 4) or, alternatively, the delivery address can be left blank. In the latter case, the mail class and serialized indicium (within the IBI indicium) would be the major element of the postage label. Several of these preprinted labels could be taken on a business trip by the account holder and that person could simply write the delivery address by hand when he/she needs to ship material somewhere. In this case, the tracking information would be used to determine the origin ZIP and delivery ZIP for postage computation. The weight would be captured at acceptance of the mail (for example at a counter of a post office), or would not be required in the event the mailer used on of the flat rate packages, such as for example Priority Mail Boxes, available from the USPS.

In this embodiment, billing by the postal service or authority can be accomplished automatically based on the normal in-process and delivery scans. The creator of these labels can produce them without any immediate financial impact, as he or she is only charged for postage when the label is actually used.

Figure 7:
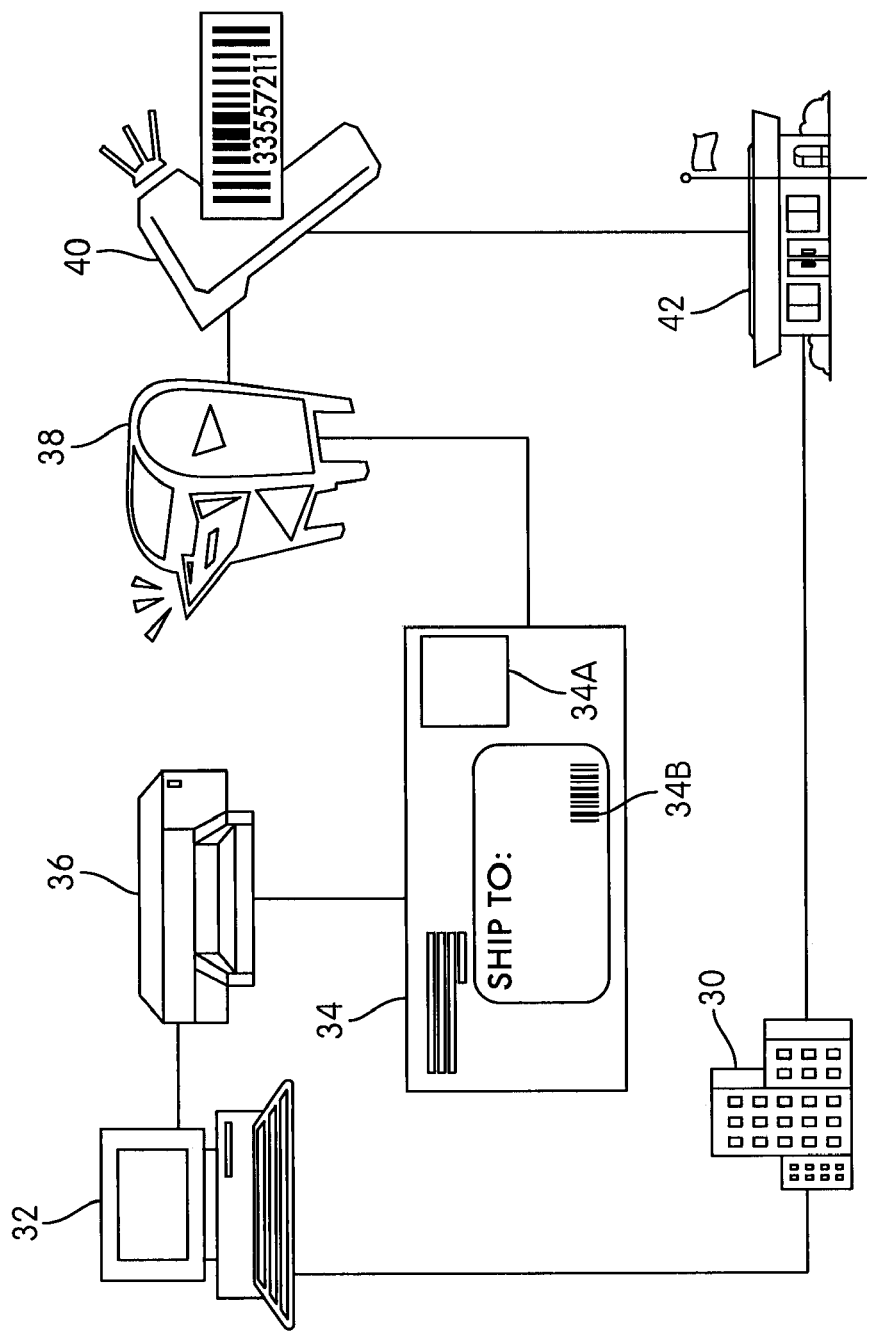
FIG. 7 depicts a schematic diagram for creating a mail label and processing the mail piece having the mail label in the mail stream, according to another embodiment of the present invention.
Figure 8:
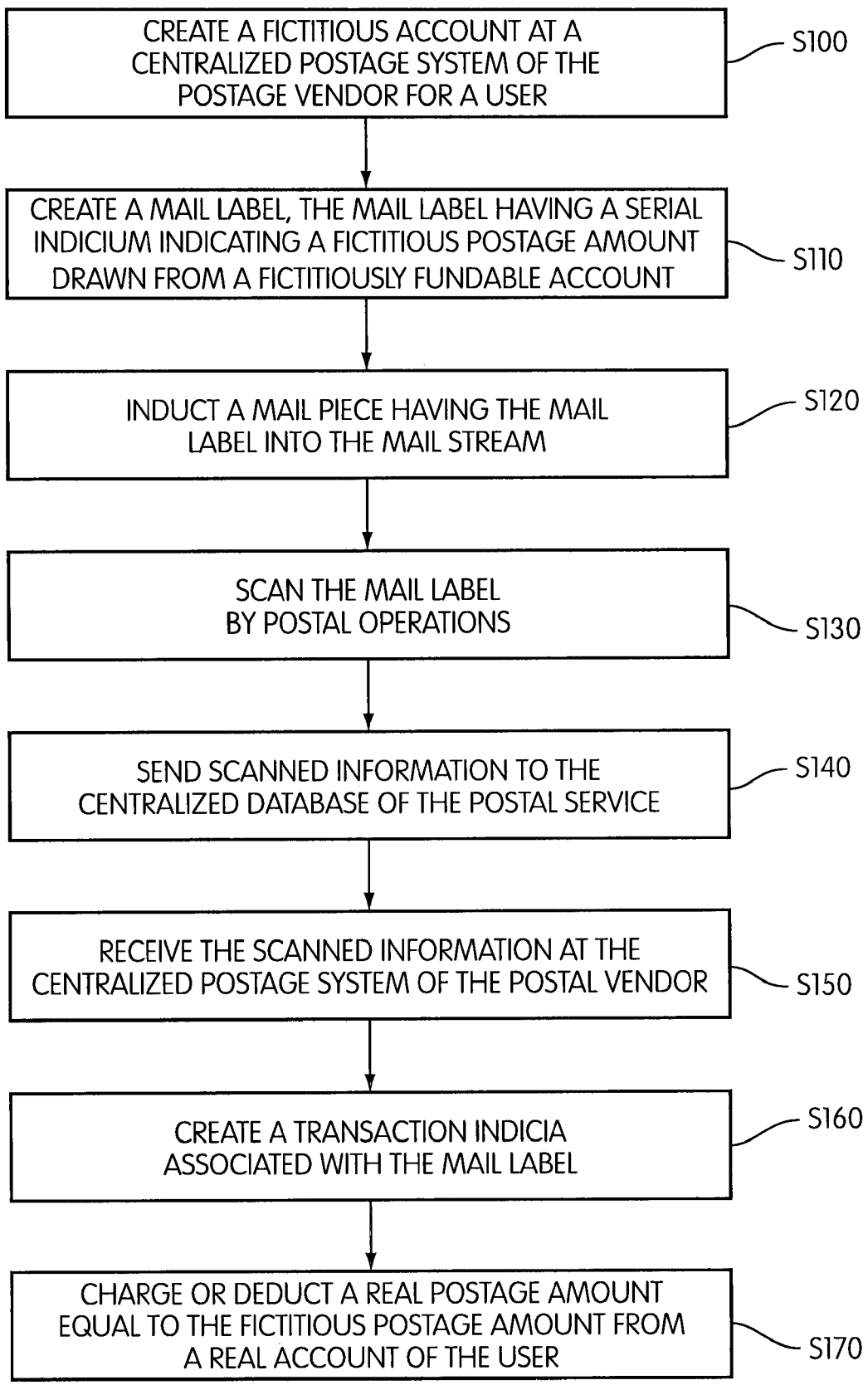
FIG. 8 is a flow chart depicting the various steps for processing mail in the mail stream, according to another embodiment of the invention.

In another embodiment, the method or system of the present invention can create a mail piece (e.g., a return shipping label) with a serialized postage value indicium associated with a fictitiously funded account or an account with faux or fictitious money. FIG. 7 depicts a schematic diagram for creating a mail label and processing the mail piece having the mail label in the mail stream, according to another embodiment of the present invention. FIG. 8 is a flow chart depicting the various steps for processing mail in the mail stream, according to another embodiment of the invention. Referring to both FIG. 7 and FIG. 8, the fictitiously funded account is created by the postage vendor (e.g., Endicia) at the centralized postage system 30 of the postage vendor and associated with the user or mailer's account at the postage centralized system 30, at S100. For example, the fictitiously funded account can be used in the case where the postal service that delivers the mail requires the presence of a monetary value (different from zero) on the postage of mail. For example, it is known that the USPS requires pre-payment for postage in order to deliver mail inducted in the mail stream.

A user interface implemented by software executed by a computer 32 of the account holder allows the account holder to create a mail label 34 by using a printer 36 connected to the computer 32, at S120. The mail label (e.g., a return shipping label) 34 may include a postage value indicium (e.g., an IBI indicium such as a 2D barcode) 34A. The mail label may include a tracking code (e.g., in a form of a barcode) 34B. The postage value indicium 34A may include a serialized indicium (e.g., a piece count). The postage value indicium 34A may include a portion of the tracking barcode 34B. For example, in one embodiment, postage value indicium 34A may include the last 9-digits of the tracking barcode 14A. In this case, scanning the tracking barcode 34B and/or the postage value indicium can identify the transaction that created the label. The tracking barcode 34B can be a "delivery confirmation" barcode in USPS First Class or Priority Mail or "an express mail tracking code" in USPS Express Mail. The postage value indicium (e.g., IBI indicium) 34A may indicate a postage amount (e.g., $4.50). This postage amount is drawn from the fictitiously fundable account, i.e., the account with faux or fictitious money. In other words, the postage amount (e.g., $4.50) is not drawn from an account reflective of real money. The fictitiously fundable account can be loaded with a desired, fictitious, sum of funds, such as for example $100,000. The postage amount ($4.50) is debited from this sum of funds in the fictitiously funded account (e.g., $100,000) to "pay" for the postage of the mailing label (e.g., a return mailing or shipping label).

In this way, when the mail piece is inducted into the mail stream (represented in FIG. 7 by a street mail postal mail box 38), at S120, the postal service (e.g., USPS) operations performs operational scans of postage indicia (e.g., postage barcode such as a 2D barcode) 34A and/or tracking indicia (e.g., a tracking barcode such as a 1D barcode) 34B using scanner 40, at S130. The label 34 may be scanned at numerous points along its delivery cycle by the postal service operations. In one embodiment, the label 34 can be for example scanned one, two or more times, for example at delivery, and at various times as the mail associated with the label traverses the postal service operational system. The scanned information including the tracking barcode (e.g., a 1D barcode) 34B and optionally the postage value indicium 34A and optionally the weight of the mail piece are sent to the centralized database of postal service 42 (e.g., USPS Package Tracking System), at S140. The scanned information is reported back to the centralized postage system 30 of the postage vendor (e.g., Endicia). The central mail facility 22 provides the tracking barcode 34B and optionally the postage value indicium (e.g., 2D barcode) 34A scans to the centralized mail system 30 of the postage vendor. For example, in the case of the USPS, the USPS Package Tracking System (PTS) sends scanned data to the centralized postage system of the postage vendor in a form of a FTP file via FTP. The postal service will detect that the mail piece has the appropriate postage amount (e.g., $4.50) when the postal service performs operational scans. As stated above, the weight can be either recorded at induction, measured during an in process weigh/scan operation, or irrelevant in the case of using weight-independent mail class (e.g., an Express Mail Flat Rate Box or Priority Mail Flat Rate Box). When the scan information is received at the centralized postage system operation 30 of the postage vendor, at S150, the centralized postage system creates a transaction indicia that is associated with the return label having the postage value that was drawn from the fictitiously funded account (e.g., $4.50), at S160. The transaction indicia is not printed on any label but is simply electronically associated or registered with the mailer's or user's real or actually funded account. The real account of the user is associated with the credit card of the user, the financial credential of the user, or actual funded dollars held of the benefit of the user. Therefore, the user's real account is funded with real money, or has credit or access to real money, so that the account can be actually billed or charged. The postage value (e.g., $4.50) is charged to or deducted or debited from the user's real account as real money (for example, debited from the user's credit card), at S170. In one embodiment, in the case of the USPS for example, the transaction indicia can then be sent electronically to the postal service USPS to inform the USPS that real money was withdrawn from the user's real account so as to comply with USPS audit requirements.

In one embodiment, the fictitiously funded account is credited with the postage value (e.g., $4.50) but with fictitious or faux money. In another embodiment, the fictitiously funded account is not credited with the postage value (e.g., $4.50). In this case, the amount of faux money in the fictitiously funded account will decrease with usage of postage by the user. At one point, however, the fictitiously funded account may need to be replenished with fictitious or faux money to avoid a negative amount of funds in the fictitiously funded account as the postal service requires that the fictitiously funded account carries an amount of funds that is greater than zero in order to be able to print indicia with a certain postage value on a mailing label (e.g., a return mail label).

For the U.S. Postal Service, the method and system described herein could replace, for example, the Merchandize Return Label Service (MRLS) programs. An example using a mortgage application may be used to illustrate one, non-limiting use of the method and system described herein. For example, a mortgage company (i.e., the user having a real account and a fictitiously funded account set up at the centralized postage system of the postage vendor) can send numerous mortgage application packets for a mortgage to potential customers. For example, on one hand the mortgage company (the user) will pay upfront with real money withdrawn from its real account (i.e., an account having real money) for the postage of each of the mailing labels of each mortgage application packet to mail the mortgage applications. On the other hand, however, the mortgage company (the user) will pay with fictitious or faux money withdrawn from the fictitiously funded account for a return label included with the mortgage application packet. In this way, the mortgage company will not incur any mailing costs until a return label is used by the potential customer of the mortgage company (i.e., until the potential customer of the mortgage company returns a completed application packet). The other return labels that are not inducted in the mail stream (because the applicant never completes and returns the packet) will not be charged to the mortgage company's real account, as they are printed with faux money. Only a return label that is actually used to return a completed application packet to the mortgage company (or its associates) is detected in the mail stream and thus is associated with the mortgage company's real account as described in detail above.

In order to determine which scanned tracking codes (e.g., in a form of a number, a barcode, or other indicia) among a plurality of scanned tracking codes 34B in a plurality of a labels should trigger a payment at the centralized postage system 30 of the postage vendor, a file management system and method is used to determine which label(s) with tracking code(s) are created and "paid for" by an account funded with fictitious money. In one embodiment, the management system and method can perform the above by logging every tracking code 34B which is created using the account funded with fictitious money into a database and checking every postal service scan event by comparing every postal service scan event to the logged tracking codes 34B in the database to determine if a scanned tracking barcode is one created using the account funded with fictitious money.

In another embodiment, the management system and method can perform the above by issuing tracking codes with a specific range of numbers. For example, when a label is created using the account funded with fictitious money, the system issues tracking codes from a subset of the postage vendor's tracking codes. This allows a faster identification of a scan event that scans a tracking code "paid for" by a fictitious account. Rather than checking the whole database of all the postage vendor's tracking codes, the system determines if a specific tracking code "paid for" by the fictitious account falls within a specified range or sub-set of tracking codes. For example, this can be implemented for express mail labels of the USPS.

In another embodiment, the system and method can determine which scanned tracking codes or tracking barcodes 34B among a plurality of scanned tracking codes or tracking barcodes 34B in a plurality of labels should trigger a payment at the centralized postage system 30, by using a postal service issued mail identification number (MID) in which a specific MID number is assigned for labels 34 paid by the account with fictitious money. In one embodiment, the MID is a 6 to 9 digit number which is used in the delivery confirmation type tracking code 34B. FIG. 7 depicts an example of LISPS PRIORITY MAIL® label including a tracking code 34B, The tracking code or tracking barcode 34B includes the MID number (e.g., 148008600). In one embodiment, the MID number is placed around a middle portion of the tracking code 34B. Hence, by using a unique MID number to construct the tracking code for labels paid by the account funded with fictitious money, the labels paid by the account funded with fictitious money can easily be identified hence flagged for payment by an account funded by real money, as described in the above paragraphs.

In yet another embodiment, the system and method can determine which scanned tracking codes or tracking barcodes 34B among a plurality of scanned tracking codes or tracking barcodes 34B in a plurality of labels should trigger a payment at the centralized postage system 30, by using a postal service issued general purpose mail identification number (MID) and/or a client mailer identification number (CMID). The general purpose MID number assigned to the postage vendor by the postal service can be used to construct the tracking code 34B. Alternatively or in addition, the unique CMID number can be assigned to a given postage account opened at the centralized postage system 30 of the postage vendor. The CMID number can also be used in constructing tracking codes 34B for that given postage account. This unique postage account with the CMID number can be, for example, a postage account of a client of the postage vendor. Alternatively, this postage account with the CMID number can be an account of the postage vendor reserved for a particular use such as, for example, reserved for labels with tracking codes "paid for" by the account funded with fictitious money. In any case, the postage vendor uploads into or sends to a computer system of the postal service (e.g., USPS) 42, a postage vendor file containing all tracking codes of all labels created during a certain time period (e.g., one day, two days, 12 hours, 6 hours, etc.). The uploaded postage vendor file has a header record containing the general purpose MID number assigned to the postage vendor by the postal service. On this file all the tracking codes used during that time period are logged. The tracking codes recorded in this postage vendor file contain at least the MID number assigned to the postage vendor. In this way, the postal service (e.g., USPS) knows that all the tracking codes in this file with the header MID number "belong" to the postage vendor.

When the postal service 42 detects a label having a tracking code containing the MID number during a field scan event, the postal service 42 records that tracking code 34B into a first file (e.g., an FTP file) that the postage vendor can retrieve or download. Alternatively, instead of the first file being retrieved or downloaded by the postage provider 30, the postal service can send the first file to the postage provider. In addition, at least a portion (i.e., one or more) of the tracking codes recorded in the postage vendor file may further contain the CMID number. When a label having a tracking code containing the CMID number (in addition to the general purpose MID number) is detected during a field scan event, the postal service 42 records the detected tracking code including the CMID number into a second file (e.g. a second FTP file). The second file containing the tracking code including the CMID number can be retrieved by or sent to a client of the postage vendor. Alternatively, the second file (e.g., a second FTP file) containing the tracking code including the CMID number can be retrieved by the postage vendor. In this way, the postage vendor can easily distinguish the scanned tracking codes having the general purpose MID number from the scanned tracking codes having, in addition to the MID number, the CMID number such as scanned tracking codes paid for by the account funded with fictitious money. In this way, scanned tracking codes that are paid for by the account funded by fictitious money can be isolated for further processing as described in the above paragraphs.

Figure 9:
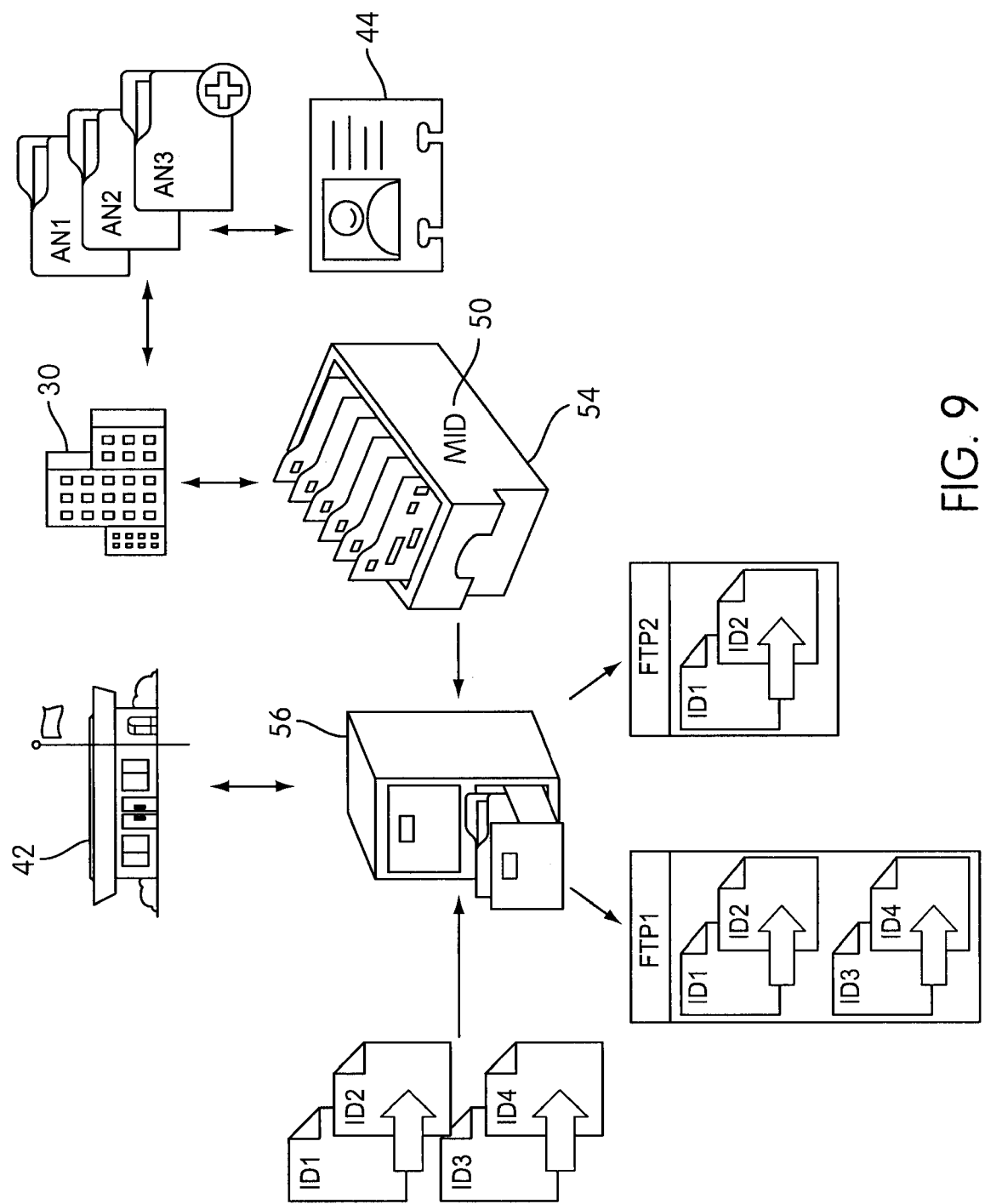
FIG. 9 is a schematic diagram showing a file management system, according to an embodiment of the present invention.

FIG. 9 is a schematic diagram showing a file management system, according to an embodiment of the present invention. The centralized postage system 30 of the postage vendor is provided with one or more mailer identification numbers MID and/or one or more client identification numbers CMID by the postal service 42. The centralized postage system 30 manages a plurality of accounts of a plurality of users. The plurality of users are assigned different account numbers AN1, AN2, AN3, etc. Each user has at least one account. For example, the mortgage company (one of the users) 44 uses its account (for example AN2) set up at the postage vendor's centralized postage system 30 to fund its mortgage application campaign. All tracking codes created by the postage vendor during a certain time period (e.g., one day) are logged into a postage vendor file (e.g., an FTP file) 54. The postage vendor file 54 is assigned the mailer identification number MID 50 of the postage vendor as a header of the file. In one embodiment, all tracking codes logged into file 54 include the MID number 50 assigned to the postage vendor. Some tracking codes recorded in file 54 may contain in addition to the MID number 50 a CMID number. The file 54 is sent to or uploaded into a database 56 of the postal service 42.

When tracking codes ID1, ID2, ID3 and ID4 generated by the postal vendor and including the MID number 50 of the postage vendor are detected by the postal service 42, the tracking codes ID1, ID2, ID3 and ID4 are recorded in a first file FTP1 in postal service database 56. When, for example tracking codes ID1 and ID2 in return labels 34 associated with the mailing campaign of the mortgage company and including a CMID number indicating that the label is paid for using an account funded with fictitious money is detected by the postal service 42, the tracking codes ID1 and ID2 are recorded in second file FTP2 in postal service database 56. The first file FTP1 and the second file FTP2 are sent to or can be downloaded by the postage vendor central computer 30. Since the second file FTP2 only contains the tracking codes of labels paid for by the account funded by fictitious money, the scanned tracking codes that are paid for by the account funded by fictitious money are thus automatically segregated for further processing. The segregation between the tracking codes paid for by real money and fictitious money is accomplished automatically by the postal service.

In this way each mail label (e.g., return mail label) paid for by the account funded with fictitious money detected in the mail stream can be accounted for and charged to the account of the user funded with real money.

Therefore, the method and system described herein allow, for example, the creation and distribution of numerous serialized shipping labels without actually incurring the upfront cost of the postage indicium, as the postage indicium is printed with a fictitious monetary value. The fictitious monetary value is translated into a real monetary value by withdrawing funds from a user's real account funded with real money only when the serialized shipping label is detected in the mail stream. As a result, this can provide cost savings for the shipper (e.g., the mortgage company) as the mailing label does not have a real monetary mailing cost for the shipper until it is used for shipping a package or sending mail from point A to point B.

The method and system according to another embodiment also allow for pre-addressed labels, or labels where the destination address is filled out by hand, for example while a person is on travel.

Figure 10:
FIG. 10 depicts a computer system for processing a mailing label, according to an embodiment of the present invention.
Figure 11:
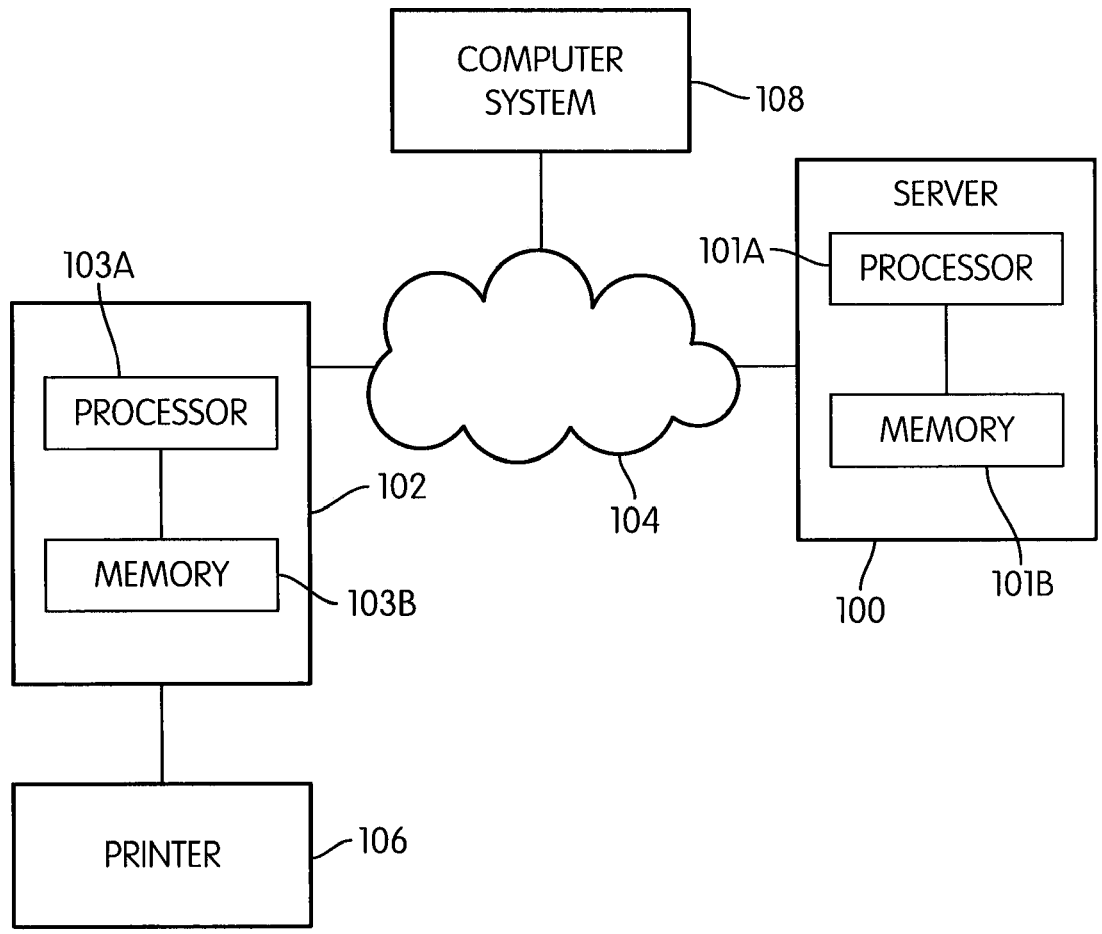
FIG. 11 depicts a computer system for processing a mailing label, according to an embodiment of the present invention.

FIG. 11 depicts a computer system for processing a mailing label as described above, according to an embodiment of the present invention. FIG. 11 shows a connection diagram for accessing a centralized postage system including computer server 100 associated with the postage vendor by a user's personal computer 102 via the internet 104. As shown in FIG. 11, both the computer server 100 and the personal computer 102 are connected via the internet 104. However, alternatively, the personal computer 102 and the server 100 can also be connected through a dedicated communication line (not shown) instead of via the internet 104. As it can be appreciated, in one embodiment, the computer server 100 has at least one processing device 101A and at least one storage device (memory) 101B in communication with the processing device 101A. Although the storage device 101B is shown residing the computer server 100, the storage device 101B can reside outside the server 100, for example in another storage server (not shown). Similarly, the personal computer 102 comprises a processor 103A and a storage device (memory) 103B in communication with the processor 103A. Various peripheral devices can be connected to the personal computer 102. For example, as shown in FIG. 10, a printer 106 is shown connected to the personal computer 102. Furthermore, as shown in FIG. 10, the computer server 100 associated with the postage provider is further in communication with the computer system 108 of the postal service (e.g., USPS) via the internet 104. However, alternatively, the server 100 and the computer system 108 can also be connected through a dedicated communication line (not shown) instead of via the internet 104.

In one embodiment, a software application is employed by the user to access a web service in the server 100 to purchase and print postage labels. In one embodiment, the software application can reside in the user's personal computer 102. The software application can be obtained from the postage vendor or other vendors having a business relationship with the postage vendor. For example, the software application can be downloaded from an internet webpage of the postage vendor (e.g., downloaded from the server 100). Alternatively, the software application can be obtained in a storage medium such as a CDROM, a USB flash memory or a PCMCIA memory card. The software application can be obtained free of charge or for a fee. Once the software application is installed in a personal computer 102 of the user, the software application is ready to be used by the user to purchase postage labels.

By personal computer 102, it is meant that any computing device capable of running the software application and providing for the user access to the internet 104 can be used, such as, but not limited to, a server, a desktop computer, a laptop computer, a handheld computing device, etc. Alternatively, the user does not need to install the software application on the personal computer 102. For example, the software application can be a web-based application and can be executed in the computer server 100 associated with the postage vendor.

The system is configured to implement the method or methods described in detail in the above paragraphs. In one embodiment, a real account is established at the server 100 for the user. Postage can be billed to the real account for mailing of a mail piece with the printed mailing label. In addition, a fictitiously funded account is further established for the user, the fictitiously funded account having fictitious money. The mailing label is provided with a serial indicium associated with the fictitiously funded account. For example, the mailing label is printed using printer 106 of the user. When the mailing label having the serial indicium printed thereon is inducted into the mail stream, the postal service scans the mailing label and captures information on the mailing label. The captured information is sent to computer system 108 of the postal service (e.g., USPS) which in turn sends the information to the server 100 associated with the postage provider. The server 100 associated with the postage provider receives information scanned from the mailing label on the mail piece. The processor 101A in the computer server processes the received information and deducts funds from the real account of the user based upon the received scanned information.

As it can be appreciated from the above, in one embodiment, the method and system described herein can be similar to a UPS™ or FedEx® type of billing system which is more or less based on a "bill-on-performance model" but using the existing geographically distributed resources of a national postal service such as USPS. This allows, for example, the USPS to offer billing protocols which are preferred by shippers but without requiring the USPS to invest capital in new systems to handle billing in a point to point network.

Although the various steps of the method of providing or printing postage indicia are described in the above paragraphs as occurring in a certain order, the present application is not bound by the order in which the various steps occur. In fact, in alternative embodiments, the various steps can be executed in an order different from the order described above.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

Furthermore, since numerous modifications and changes will readily occur to those of skill in the art, it is not desired to limit the invention to the exact construction and operation described herein. Accordingly, all suitable modifications and equivalents should be considered as falling within the spirit and scope of the invention.

What is claimed:

1. A system for facilitating transaction data retrieval from a postage vendor system database via label generation with multiple representations of a postage tracking identifier portion, the system comprising:

a vendor computer system configured to:

obtain a carrier-specific tracking identifier unique within a carrier computer system with respect to accounts recognized by the carrier computer system;

generate, based on the carrier-specific tracking identifier, a postage tracking identifier having a length longer than the carrier-specific tracking identifier such that (i) the postage tracking identifier comprises the carrier-specific tracking identifier and (ii) the postage tracking identifier is allocated to a postage transaction and enables a mail piece associated with the postage transaction to be tracked within the carrier computer system;

allocate a trackable portion of the postage tracking identifier to the postage transaction in one or more databases of the vendor computer system;

generate a postage value indicium identifier such that the postage value indicium identifier comprises (i) the trackable portion of the postage tracking identifier and (ii) data representing a price associated with the postage transaction, thereby enabling the vendor computer system to identify the postage transaction using (i) the postage value indicium identifier without the postage tracking identifier or (ii) the postage tracking identifier without the postage value indicium identifier;

cause an end-user computer to print the postage value indicium identifier as a first bar code on a first mail piece and the postage tracking identifier as a second bar code on a different portion of the first mail piece than the first bar code such that the trackable portion of the postage tracking identifier is represented at least twice on separated portions of the first mail piece, wherein the vendor computer system is associated with at least two vendor accounts, a first of the at least two vendor accounts being a funded account, and a second of the at least two vendor accounts being a fictitiously fundable account; and the carrier computer system configured to:

execute a fictitious transaction in the fictitiously fundable account in response to the vendor computer system printing the postage value indicium; and execute a real transaction in the funded account in response to the first mail piece being identified as present in the mail stream by the carrier computer system.

2. A system as in claim 1, wherein the vendor computer system is further configured to:

generate a postage vendor file containing trackable portions of postage tracking identifiers generated over a time period; and periodically upload, to the carrier computer system, the postage vendor file for processing by the carrier computer system.

3. A system as in claim 2, wherein the postage tracking identifiers include at least a portion that allows the vendor to be identified by the carrier computer system.

4. A system as in claim 1, wherein the first barcode and the second barcode are of different types.

5. A system as in claim 4, wherein the first barcode is a 1D barcode and the second barcode is a 2D barcode.

6. A system as in claim 1, wherein the trackable portion comprises a barcode selected from the group consisting of: a delivery confirmation barcode, an express mail tracking barcode, or a customs barcode.

7. A system as in claim 1, wherein the first mail piece comprises a return mailer, and the postage value indicium identifier data representing the price associated with the postage transaction represents a cost of shipping the return mailer from a third party location to the postage vendor, and wherein the carrier computer system only charges the postage vendor for the transaction in the event that the first mail piece is identified as present in the mail stream by the carrier computer system.

8. A system as in claim 1, wherein the vendor computer system is configured to selectively produce postage value indicium identifiers associated with either the funded account or the fictitiously fundable account.

9. A system as in claim 1, wherein the first mail piece comprises a return mailer, and the postage value indicium identifier data representing the price associated with the postage transaction represents a cost of shipping the return mailer from a third party location to the postage vendor.

10. A method of facilitating transaction data retrieval from a postage vendor system database via label generation with multiple representations of a postage tracking identifier portion, the method comprising:

obtaining, by a vendor computer system associated with a postage vendor, a carrier-specific tracking identifier unique within a carrier computer system with respect to accounts recognized by the carrier computer system;

generating, by the vendor computer system, based on the carrier-specific tracking identifier, a postage tracking identifier having a length longer than the carrier-specific tracking identifier such that (i) the postage tracking identifier comprises the carrier-specific tracking identifier and (ii) the postage tracking identifier is allocated to a postage transaction and enables a mail piece associated with the postage transaction to be tracked within the carrier computer system;

allocating, by the vendor computer system, a trackable portion of the postage tracking identifier to the postage transaction in one or more databases of the vendor computer system;

generating, by the vendor computer system, a postage value indicium identifier such that the postage value indicium identifier comprises (i) the trackable portion of the postage tracking identifier and (ii) data representing a price associated with the postage transaction, thereby enabling the vendor computer system to identify the postage transaction using (i) the postage value indicium identifier without the postage tracking identifier or (ii) the postage tracking identifier without the postage value indicium identifier;

causing, by the vendor computer system, an end-user computer to be enabled to print the postage value indicium identifier as a first barcode on a first mail piece and the postage tracking identifier as a second barcode on a different portion of the first mail piece than the first barcode such that the trackable portion of the postage tracking identifier is represented at least twice on separated portions of the first mail piece, wherein the vendor computer system is associated with at least two vendor accounts, a first of the at least two vendor accounts being a funded account, and a second of the at least two vendor accounts being a fictitiously fundable account;

executing, by the carrier computer system, a fictitious transaction in the fictitiously fundable account in response to the vendor computer system printing the postage value indicium; and executing, by the carrier computer system, a real transaction in the funded account in response to the first mail piece being identified as present in the mail stream by the carrier computer system.

11. A method as in claim 10, further comprising:
generating, by the vendor computer system, a postage vendor file containing trackable portions of postage tracking identifiers generated over a time period;
periodically uploading, to the carrier computer system, the postage vendor file for processing by the carrier computer system.

12. A method as in claim 11, wherein the postage tracking identifiers include at least a portion that allows the vendor to be identified by the carrier computer system.

13. A method as in claim 10, wherein the first barcode and the second barcode are of different types.

14. A method as in claim 13, wherein the first barcode is a 1D barcode and the second barcode is a 2D barcode.

15. A method as in claim 10, wherein the trackable portion comprises a barcode selected from the group consisting of: a delivery confirmation barcode, an express mail tracking barcode, or a customs barcode.

16. A method as in claim 10, wherein the first mail piece comprises a return mailer, and the postage value indicium identifier data representing the price associated with the postage transaction represents a cost of shipping the return mailer from a third party location to the postage vendor, and wherein the carrier computer system only charges the postage vendor for the transaction in the event that the first mail piece is identified as present in the mail stream by the carrier computer system.

17. A method as in claim 10 wherein the vendor computer system is configured to selectively produce postage value indicium identifiers associated with either the funded account or the fictitiously fundable account.

18. A method as in claim 10, wherein the first mail piece comprises a return mailer, and the postage value indicium identifier data representing the price associated with the postage transaction represents a cost of shipping the return mailer from a third party location to the postage vendor.

19. A method comprising:
obtaining, by a vendor computer system associated with a postage vendor, a carrier-specific tracking identifier unique within a carrier computer system with respect to accounts recognized by the carrier computer system;

generating, by the vendor computer system, based on the carrier-specific tracking identifier, a postage tracking identifier having a length longer than the carrier-specific tracking identifier such that the postage tracking identifier comprises the carrier-specific tracking identifier, the postage tracking identifier is allocated to a postage transaction and enables a mail piece associated with the postage transaction to be tracked within the carrier computer system, and the postage tracking identifier comprises a portion indicating that the price associated with the postage transaction is drawn from an account not reflective of real money that is recognizable by the carrier computer system;

allocating, by the vendor computer system, a trackable portion of the postage tracking identifier to the postage transaction in one or more databases of the vendor computer system;

generating, by the vendor computer system, a postage value indicium identifier such that the postage value indicium identifier comprises at least one of: the trackable portion of the postage tracking identifier and data representing a price associated with the postage transaction, thereby enabling the vendor computer system to identify the postage transaction using at least one of: the postage value indicium identifier without the postage tracking identifier and the postage tracking identifier without the postage value indicium identifier;

causing, by the vendor computer system, an end-user computer to be enabled to print the postage value indicium identifier as a first barcode on a first mail piece and the postage tracking identifier as a second barcode on a different portion of the first mail piece than the first barcode such that the trackable portion of the postage tracking identifier is represented at least twice on separated portions of the first mail piece, wherein the vendor computer system is associated with at least two vendor accounts, a first of the at least two vendor accounts being a funded account, and a second of the at least two vendor accounts being a fictitiously fundable account;

executing, by the carrier computer system, a fictitious transaction in the fictitiously fundable account in response to the vendor computer system printing the postage value indicium; and executing, by the carrier computer system, a real transaction in the funded account in response to the first mail piece being identified as present in the mail stream by the carrier computer system.

\* \* \* \* \*